United States Patent Office 2,791,606
Patented May 7, 1957

2,791,606
SYNTHESIS OF GLUTAMIC ACID AND SALTS THEREOF

Leo J. Novak and Jack J. Bulloff, Dayton, Ohio, assignors to The Commonwealth Engineering Company of Ohio, Dayton, Ohio, a corporation of Ohio No Drawing. Application June 7, 1954,
Serial No. 435,096

4 Claims. (Cl. 260—533)

This invention relates to an improved method for synthesizing glutamic acid and salts thereof.

Monosodium glutamate has attained wide commercial acceptance as a cooking aid since it has been found to enhance the natural flavor and taste of various foods without itself contributing any noticeable odor or taste to the food.

The monosodium salt having value for accenting food flavors is derived from the active levorotatory form of the acid. This latter substance occurs naturally in vegetable protein hydrolyzates from which it can be extracted. However, the selective extraction of the l-glutamic acid is an expensive process and the cost of the extracted acid is, therefore, quite high.

Various organic syntheses of glutamic acid are known, including procedures utilizing, as starting materials, relatively expensive malonic acid derivatives such as aminomalonic esters, benzoylaminomalonic esters, aceto-aminomalonic ester and phthalimidomalonic ester. These processes are tedious and result in low yields of a racemic product, i. e., a mixture of d-and l-glutamic acid in which the l-glutamic acid is present in an amount of about 50%. To find a market for use as a flavor enhancing agent with the sodium salt of protein hydrolyzate extracts in which the active l-glutamic acid is not admixed with the inactive dextro-rotary form, the sodium salt derived from racemic glutamic acid containing only about 50% by weight of the active levorotatory form, must sell at about half the price of the salt of the protein hydrolyzate extracts. This is not feasible economically since the cost of synthesizing the acid by the known methods is relatively high.

One object of the present invention is to provide a new and improved method of synthesizing glutamic acid utilizing comparatively inexpensive starting materials and reagents and involving a series of reactions which are readily controllable.

Another object is to provide a method of synthesizing sodium glutamate which can be profitably marketed at a price considerably less than that of the sodium salt of glutamic acid synthesized by the procedures heretofore available to the art.

These and other objects are achieved by utilizing, as starting material for the synthesis, cyclopentadiene obtained by depolymerization of readily available and inexpensive polymers of cyclopentadiene such as the dimer, dicyclopentadiene, which is easily depolymerized to the active monomer by distillation at atmospheric pressure.

In a preferred embodiment of the invention, the dicyclopentadiene is depolymerized to cyclopentadiene by distillation, the monomer is treated with gaseous hydrogen chloride or bromide to produce 2-chloro- or 2-bromocyclopentene-1, the cyclopentene-1 is oxidized, with cleavage of the ring, to 2-chloroglutaric or 2-bromoglutaric acid which, on ammonolysis, yields ammonium glutamate, the latter being converted to glutamic acid hydrochloride which, on treatment with aqueous sodium hydroxide, yields a mixture of substantially equal proportions of the sodium salts of the active l-glutamic acid and inactive d-glutamic acid.

In a modification of the procedure outlined, the 2-chloro- or 2-bromo-cyclopentene-1 is converted directly to 2-amino-cyclopentene-1 by treatment with an excess of an aqueous solution of ammonia, and the amino group is protected during oxidation and opening of the ring by intermediate acylation, whereby the two hydrogen atoms of the amino group are replaced by lower acyl (2–4 carbons) radicals. Oxidation of the diacylated amino cyclopentene-1 in the presence of sulfuric acid yields the corresponding diacylated glutamic acid which, on heating in the presence of the sulfuric acid, is converted to glutamic acid sulfate, the latter being in turn converted to the monosodium glutamate on treatment with aqueous sodium hydroxide. In this modified procedure oxidation of the diacylated amino cyclopentene-1 and conversion of the resulting diacylated glutamic acid to the sulfate are preferably carried out in the same reaction vessel, without intermediate isolation of the oxidation product.

The following examples are given to illustrate the invention, it being understood that these examples are not intended to be limitative with respect to the specific details thereof.

Example I

About 1220 lbs. of 73% dicyclopentadiene are charged into a still and heated at 170° C. using a double-tandem reflux-condenser. About 792 lbs. of the cyclopentadiene collected in the condenser are cooled in a tank and hydrogen chloride gas is bubbled through the cooled liquid at a temperature below —25° C., usually at —30° C. to —35° C., until 2-chlorocyclopentene-1 is produced. About 1128 lbs. of the latter are then treated with an excess of potassium permanganate and sulfuric acid, preferably introduced into the warmed solution concurrently and in the form of thin streams, with stirring of the mass. This oxidizing treatment opens the ring, with production of 2-chloroglutaric acid. About 1600 lbs. of the 2-chloroglutaric acid are autoclaved in 1300 lbs. of water containing 850 lbs. of ammonia and 1300 lbs. of $CO_2$ at a temperature of 50° C. and under a pressure of 50 p. s. i. for 12 hours to produce 1300 lbs. of ammonium glutamate. The ammonium glutamate is treated with hydrochloric acid, the hydrochloride being formed, and an aqueous solution of sodium hydroxide is added to adjust the pH to the alkaline side and produce the desired sodium glutamate, which may be recovered from the solution by evaporation of the water, together with sodium chloride, the presence of which latter may be desirable in the condiment.

Instead of potassium permanganate, other similar oxidizing agents may be used, such as perrhenates, vanadates, chromates, ferrates or periodates. Instead of oxidizing the 2-halocyclopentene-1 in aqueous medium, a catalytic vapor phase process using air as the oxidant may be employed.

Other variations may be made in the procedure of Example I. Thus, the 2-chloroglutaric acid may be aminated by autoclaving in from 1300 to 4250 lbs. of water at 35° C. to 65° C. and under a pressure of from 0 to 200 p. s. i. Also, for the amination, from 850 to 1250 lbs. of ammonia and from 1300 to 2640 lbs. of $CO_2$ may be used in the solution. The procedure described has the advantage that only a relatively small amount of ammonia is required to prevent the formation of polyalkylated by-products, i. e., only about 4 to 7 mols. The pH at which the amination is conducted under the conditions described prevents hydrolysis of the 2-chloroglutaric acid to 2-hydroxyglutaric acid and, in addition, under the described operating conditions, carbamate groups are formed which inhibit the formation of polyalkylated ammonium salts, thus avoiding another of the major disadvantages of prior syntheses.

*Example II*

Example I is repeated except that hydrogen bromide gas is introduced into the liquid cyclopentadiene, to form 2-bromo-cyclopentene-1. The 2-bromo-cyclopentene-1 is then worked up to sodium glutamate as described in Example I.

*Example III*

About 1220 lbs. of 73% dicyclopentadiene are charged into a still and distilled as in Example I. Hydrogen chloride gas is bubbled into 792 lbs. of the cyclopentadiene recovered in the distillation until 2-chlorocyclopentene-1 is produced. The 2-chlorocyclopentene-1 is converted directly to the 2-amino-cyclopentene-1 by autoclaving 1128 lbs. of the chloro-derivative with 5000 lbs. of 26% aqueous ammonia for 8 hours at 120° C. and 70 p. s. i. About 750 lbs. of the 2-amino-cyclopentene-1 thus obtained are acetylated by treatment with excess acetyl chloride, and the diacetylated product, 2 (diacetylamino) cyclopentene-1, is oxidized by treatment with potassium permanganate in the presence of sulfuric acid, the oxidizing agent and catalyst being introduced into the mass comprising the diacetylated material concurrently in the form of thin streams, with continuous stirring of the mass to insure uniform distribution of the permanganate and catalyst therethrough. The mass is then heated for 5 to 10 minutes to effect conversion of the diacetyl glutamic acid resulting from the oxidation, to glutamic acid sulfate, after which sufficient aqueous sodium hydroxide is added to convert the sulfate to sodium glutamate.

The conditions may be varied. Thus, the 2-chlorocyclopentene-1 may be autoclaved with an aminating solution consisting of from 5000 to 10,000 lbs. of 26% to 30% aqueous ammonia for 8 to 12 hours at 120° C. to 170° C. and a pressure of from 70 to 200 p. s. i. Also, instead of oxidizing the diacetylamino-cyclopentene-1 by means of potassium permanganate in the presence of sulfuric acid, from 30% to 60% nitric acid may be used as the oxidizing agent, and the ammonium glutamate thus produced may be isolated, acidified with hydrochloric acid and then treated with aqueous sodium hydroxide to produce the monosodium glutamate.

Oxidizing acids other than nitric acid may be used, such as perchloric, periodic or selenic acid.

The sodium glutamate (consisting of a mixture of substantially equal proportions of the 1- and d-forms) is obtained in good yield as a white or almost white crystalline powder which may be added to meat and other foodstuffs to enhance the natural food flavor. The overall cost of producing the sodium glutamate by the present procedure is comparatively low so that the product can be marketed at a price competitive with the protein hydrolyzate extracts consisting essentially of the active levorotatory form of the acid.

Instead of obtaining the cyclopentadiene by distillation of the dimer, other polymers of cyclopentadiene may be depolymerized to the monomer by distillation, such as the trimer, tetramer, etc.

It will be understood that when it is desired to produce glutamic acid as such for any purpose, as for medicinal use, the free amino acid may be obtained directly or recovered from the salt by neutralization of the latter. The hydrochloride may also be used as such, for instance in the treatment of achlorhydria and hypochlorhydria. Likewise, when other alkali metal salts of glutamic acid are desired, these may be obtained by treating the hydrochloride with an aqueous solution of the appropriate alkali metal hydroxide, or alkaline earth metal hydroxide, such as potassium, lithium or calcium hydroxide.

It will also be apparent that this invention provides a novel method for producing 2-haloglutaric acids, 2-monoacyl and 2-diacylamino-1,5 dicarboxylic acids, 2-monoacyl and 2-diacylaminocyclopentene-1.

Since the variations in details mentioned herein, and others, may be made within the scope of the disclosure, and without departing from the spirit and scope of the invention, it is to be understood that it is not intended to limit the invention except as defined in the appended claims.

What is claimed is:

1. In a method for synthesizing glutamic acid and salts thereof, the steps comprising distilling a polymer of cyclopentadiene to obtain the monomer, treating the monomeric cyclopentadiene with a gaseous hydrogen halide selected from the group consisting of hydrogen chloride and hydrogen bromide at a temperature of from about −30° C. to −35° C., treating the resulting 2-halo-cyclopentene-1 with an oxidizing agent to cleave the ring and produce the corresponding 2 - halo - glutaric acid, autoclaving the latter in water containing carbon dioxide and from 4 to 7 mols of ammonia per mol of the 2-haloglutaric acid calculated as the salt formed by reaction of the carbon dioxide and ammonia, at a temperature between 35° C. and 65° C. and a pressure of 0 to 200 lbs./sq. in. until ammonium glutamate is produced, treating the latter with hydrochloric acid to convert it to glutamic acid hydrochloride, and treating the hydrochloride with an aqueous solution of a base selected from the group consisting of alkali metal and alkaline earth metal hydroxides to convert the hydrochloride to the alkali metal, respectively alkaline earth metal, glutamates.

2. The method according to claim 1, characterized in that the oxidation agent used to cleave the ring of the 2-halo-cyclopentene-1 and produce the 2-halo-glutaric acid is potassium permanganate and the oxidation is carried out in the presence of sulfuric acid.

3. The method according to claim 1, characterized in that the ammonolysis of the 2-halo-glutaric acid is carried out at about 50° C. and under a pressure of about 50 lbs./sq. in.

4. The method according to claim 1, characterized in that the glutamic acid hydrochloride is treated with aqueous sodium hydroxide.

References Cited in the file of this patent

UNITED STATES PATENTS

| 2,085,784 | Bottoms | July 6, 1937 |
| 2,225,155 | Cheronis | Dec. 17, 1940 |
| 2,323,861 | Zellner | July 6, 1943 |
| 2,390,597 | Law et al. | Dec. 11, 1945 |
| 2,438,484 | Henne | Mar. 23, 1948 |
| 2,549,456 | Gresham et al. | Apr. 17, 1951 |

OTHER REFERENCES

Wilson et al.: Chem. Reviews, vol. 34, pgs. 9–10 (1944), 1d, "Characterisation of Organic Compounds" (1947), pgs. 217–18.